United States Patent [19]

Van Slageren

[11] 4,024,583
[45] May 17, 1977

[54] MAGNETIC HEAD

[75] Inventor: Nanno Van Slageren, Eindhoven, Netherlands

[73] Assignee: U.S. Philips Corporation, New York, N.Y.

[22] Filed: Nov. 5, 1975

[21] Appl. No.: 628,949

[30] Foreign Application Priority Data

Dec. 13, 1974 Netherlands .............. 7416234

[52] U.S. Cl. .............................. 360/119; 360/118; 360/125
[51] Int. Cl.² ................. G11B 5/25; G11B 5/12
[58] Field of Search .......... 360/125, 119, 118, 123

[56] References Cited

UNITED STATES PATENTS

| 2,547,737 | 4/1951 | Blaney | 360/118 |
| 3,064,088 | 11/1962 | Springer | 360/125 |
| 3,268,878 | 8/1966 | Loman | 360/125 |
| 3,376,035 | 4/1968 | Bate et al. | 360/125 |

Primary Examiner—Robert S. Tupper
Attorney, Agent, or Firm—Frank R. Trifari; David R. Treacy

[57] ABSTRACT

A magnetic head, in particular for erasing video tapes over their full width. To permit arranging the head as closely as possible to the head wheel with the video heads, it has a circular-symmetrical construction and is placed together with a guide drum on the axis of rotation of the head wheel. The head comprises a flanged tube on which a coil is slipped, and a second flanged tube over the coil. An operational gap is formed between the two flanges.

10 Claims, 3 Drawing Figures

MAGNETIC HEAD

BACKGROUND OF THE INVENTION

1. Field of the Invention

The invention relates to a magnetic head for trackwise magnetization of a magnetizable record carrier tape over at least a part of the tape width, such a head comprising a magnetic circuit having a coil and two circuit parts of magnetisable material enclosing an operational gap.

A magnetic head of this kind is used, for example, in video recorders for erasing information recorded transversely on the video tape by means of a number of rotating video heads. The writing/reading heads in such recorders are mounted on a so-called head wheel and the video tape is deformed at the area of the head wheel so as to be able to arrange it around the head wheel at a given angle.

2. Description of the Prior Art

Since known erasing heads are constructed so that the tape must be conveyed along them in a nondeformed manner, the erasing head should always be arranged at a given distance from the head wheel. With the video recorders becoming ever smaller and more compact, it has become necessary to make the distance between the erasing head and the video heads as small as possible. This design goal also minimizes the occurrence of errors by possible stretching of the tape.

However, this close spacing has been possible only to a restricted extent, since when the known erasing heads are used one is compelled to arrange them in the region where the tape is not deformed.

SUMMARY OF THE INVENTION

The object of the invention is to provide a magnetic head for transversely scanned tape which can be arranged very close to the video heads, namely in the region where the tape is deformed, and which moreover is very simple to construct.

For that purpose, according to the invention the two circuit parts are formed by two circular-symmetrical members of approximately equal diameter arranged axially in line, opposite to each other and enclosing the operational gap at their circumference, one of said circular-symmetrical members having a central portion on which the coil is provided.

The circular-symmetrical construction of the magnetic head according to the invention can be readily manufactured. This design enables the shaft on which the head wheel is mounted to be threaded through the said construction, so that placement of the head very close to the head wheel is possible. A preferred embodiment of the magnetic head according to the invention is therefore characterized in that the circular-symmetrical members have a central aperture providing clearance for a shaft.

In certain recorders it is common practice to construct the guide members along which the video tape is passed on either side of the head wheel as cylindrical drums and to journal the shaft of the head wheel in them. In that case in a particularly advantageous embodiment, the magnetic head according to the invention bears on the drum arranged in front of the head wheel in the direction of travel; that is, on the side facing the head wheel. In this embodiment it is preferred that the outer diameter of the circular-symmetrical members (which form the circuit parts of the magnetic head) is at least equal to the largest outer diameter of the guide member.

Within the scope of the invention a number of different constructions of the magnetic head are possible, some of which will be described in greater detail, by way of example, with reference to the drawing.

DESCRIPTION OF THE PREFERRED EMBODIMENTS

Figure 1:
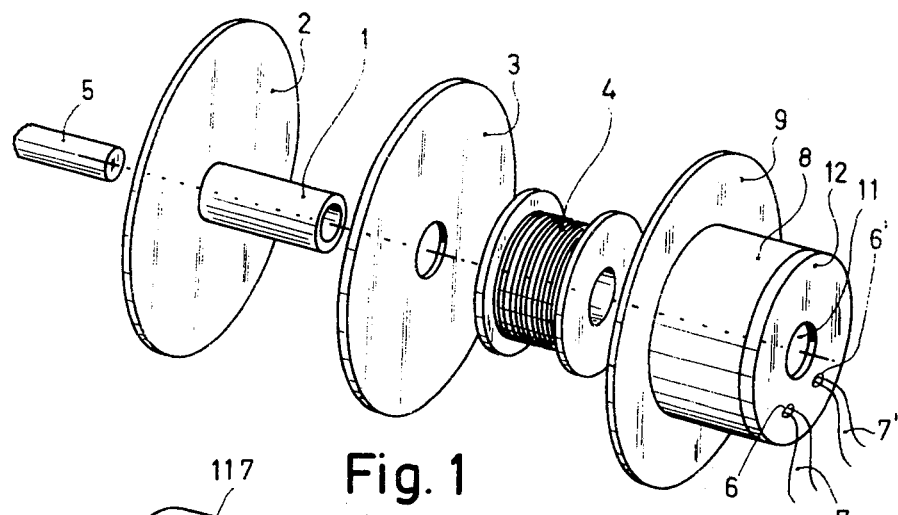
FIG. 1 is an exploded perspective view of a first embodiment of the magnetic head according to the invention.

Reference numeral 1 in FIG. 1 denotes a circular tube, or central portion, which has a flange or collar 2 and which is manufactured from a soft magnetic metal, for example a Ni-Fe alloy. A foil 3 of non-magnetisable material, such as beryllium-copper, is laid on the flange 2 and a coil 4 is slipped on the tube 1. Across the coil 4 fits a cylindrical sleeve 8 which has a flange or collar 9, both of soft magnetic material. The flange 9 has the same diameter as the flange 2.

When a metallic material, for example Ni-Fe, is used for this purpose, the sleeve 8 may be manufactured, for example, by means of deep drawing. During assembly the parts are slipped into each other in such manner that the foil 3 is clamped between the flanges 2 and 9 and an end 10 of the tube 1 remote from the collar 2 fits in a central aperture 11 of a bottom 12 which may be integral with the deep drawn sleeve 8 or a separate element as shown in FIG. 1 of the sleeve 8. The bottom 12 furthermore has apertures 6, 6' for passing ends 7, 7' of the winding of the coil 4. The thickness of the foil 3 determines the length of the operational gap of the magnetic head, which is typically a few tens of microns. A shaft 5 of the head wheel of a video recorder is passed through the whole assembly via the interior of the tube 1.

Figure 2:
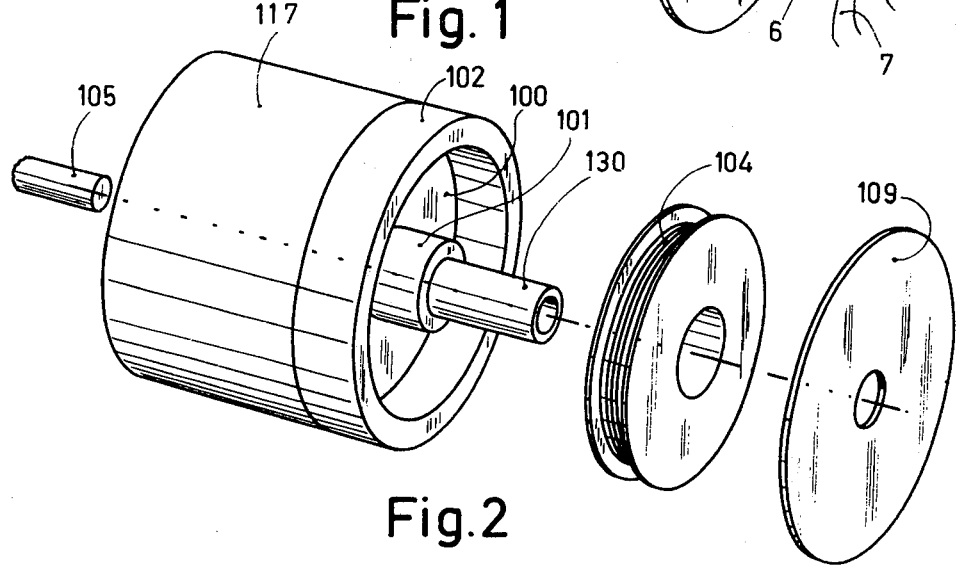
FIG. 2 is an exploded view of a second embodiment of the magnetic head according to the invention.

FIG. 2 shows in detail an embodiment preferred for use when a ceramic magnet material is chosen for the head. A circular member 100 of a soft magnetic material, such as manganese-zinc ferrite, has a central boss 101 and a circumferential collar 102. The boss 101 is hollow and is slipped concentrically on a tube 130 which is secured coaxially to the drum 117. A coil 104 is slipped over the central boss 101. The magnetic circuit of the head is then closed by means of a flat circular plate 109 made from soft magnetic material, such as the same manganese-zinc ferrite, slipped on the tube 130 into contact with the boss 101. By making the collar 101 slightly higher than the collar 102 the plate 109 clears the collar 102 axially so that an operational gap is formed between these parts.

Alternatively, the boss 101 and collar 102 may be chosen to be equally high. Then a foil of non-magnetisable material, comparable to the foil 3 of FIG. 1, should be laid between the parts 102 and 109 so as to form the operational gap. The shaft 105 of the head wheel of the video recorder is passed concentrically through the whole assembly, as in the FIG. 1 embodiment.

Figure 3:
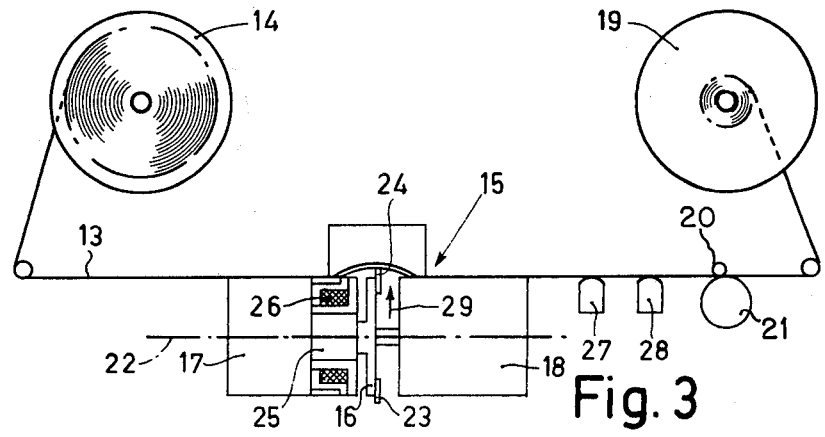
FIG. 3 is a diagrammatic plan view of a video recorder in which a magnetic head according to the invention is used.

The circular-symmetrical construction of the magnetic heads shown in FIGS. 1 and 2 make them very suitable for use in video recorders of the transverse scan type. Typically, as shown in FIG. 3, magnetic tape 13 is unwound from storage reel 14 past an assembly 15 of head wheel 16 and drums 17 and 18 to a winding reel 19. The driving is carried out by means of a capstan 20 and pressure roller 21. A shaft 22 which is driven in the direction of the arrow 29 by means of a motor (not shown) is journalled in the assembly 15. The headwheel 16 which has 4 videoheads, two of which — the heads 23 and 24 — are shown in the drawing, is rigidly secured to the shaft and hence rotates with the heads against the magnetic tape 13. The magnetic tape 13 engages the stationary drums 17 and 18 at an angle of approximately 90°.

In order to provide an erasing head which is arranged as closely as possible near the video heads, a magnetic head 25, which is identical to the magnetic head shown in FIG. 1, is provided at the end of the drum 17.

For erasing the magnetic tape 13, the coil 26 is energized with a high frequency alternating current (frequency, for example 50 – 100 kHz).

However, it is also feasible to use the head for synchronization purposes. In that case the coil 26 should be energized with a low frequency alternating current (frequency, for example, in the order of 100 Hz), the frequency showing a fixed relationship with the rotation frequency of the head wheel. A synchronisation signal is then recorded over the full width of the magnetic tape 13, after which the (high frequency) video signal is recorded across the synchronisation signal.

In order to be able to provide audio tracks on the edge of the magnetic tape 13, an audio erasing head 27 and an audio recording/playback head 28 are provided on the exit side of the assembly 15.

With a head according to the invention it is also possible not to erase the full width of the tape 13. For that purpose a tape contacting circumferential piece of at least one of the flanges of the head 25 may be omitted. In this manner, for example, the head may be designed to erase only the audio track.

What is claimed is:

1. A magnetic head for magnetisation over at least a part of the width of a magnetizable record carrier to be conveyed passed the head, comprising a first flat circular plate of the magnetizable material, a second flat circular plate of magnetizable material having thereon an outer cylindrical collar and spaced therefrom an inner central boss coaxial with said collar, and a coil located on said boss, said first plate bearing against said boss, and said first plate and said cylindrical collar being spaced apart to define an annular operational gap, whereby the magnetic head is adapted for magnetizing a tape conveyed past the head parallel to the axis of the boss.

2. A magnetic head as claimed in claim 1 wherein said boss and said flat circular plates each have a coaxial aperture adapted for passing a shaft therethrough, and wherein said boss has a height greater than a height of said cylindrical collar.

3. A magnetic rotary head assembly having two cylindrical guiding members alined coaxially with each other and a head wheel coaxially positioned between and mounted for rotation about the axis of said guiding members, wherein the improvement comprises a further fixed magnetic head comprising two circular cylindrical members separated by an annular operational gap, a central member connected with the two cylindrical members to form a flux path, and a coil disposed around said central member, said fixed magnetic head being coaxially mounted between said cylindrical guiding members facing the head wheel.

4. An assembly as claimed in claim 3 wherein a first one of said circular cylindrical members is a flat circular plate having an outside diameter and a boss, the central member being said boss, the second circular cylindrical member having at least a flat plate portion having an outside diameter equal to the outside diameter of said first member, the annular operational gap having an outside diameter equal to said outside diameter.

5. An assembly as claimed in claim 4 wherein said fixed magnetic head is a synchronizing head for recording a synchronizing signal across the full width of a tape moving over said guide passed the head and head wheel.

6. An assembly as claimed in claim 4 wherein one of said plates has thereon a tape-contacting generally circular outer cylindrical surface having a portion of said circular surface omitted such that said operational gap is only a portion of a complete ring.

7. An assembly as claimed in claim 6 wherein said fixed magnetic head is an erase head for erasing an audio track on a tape moving over said guides and past said fixed head and head wheel.

8. An assembly as claimed in claim 4 wherein said circular cylindrical members have an outside diameter at least equal to the larger outside diameter of one of said cylindrical guide members.

9. An assembly as claimed in claim 8 wherein one of said cylindrical guide members includes a tube extending coaxially toward said head wheel, and said first and second circular cylindrical members have concentric bores which are fitted over said tube to mount and align said fixed magnetic head on said one guide member.

10. An assembly as claimed in claim 8 wherein said first circular cylindrical member additionally has thereon a coaxial circular cylindrical collar extending from the plate in the same direction as the boss, said central boss having a height greater than a height of said collar.

* * * * *